UNITED STATES PATENT OFFICE.

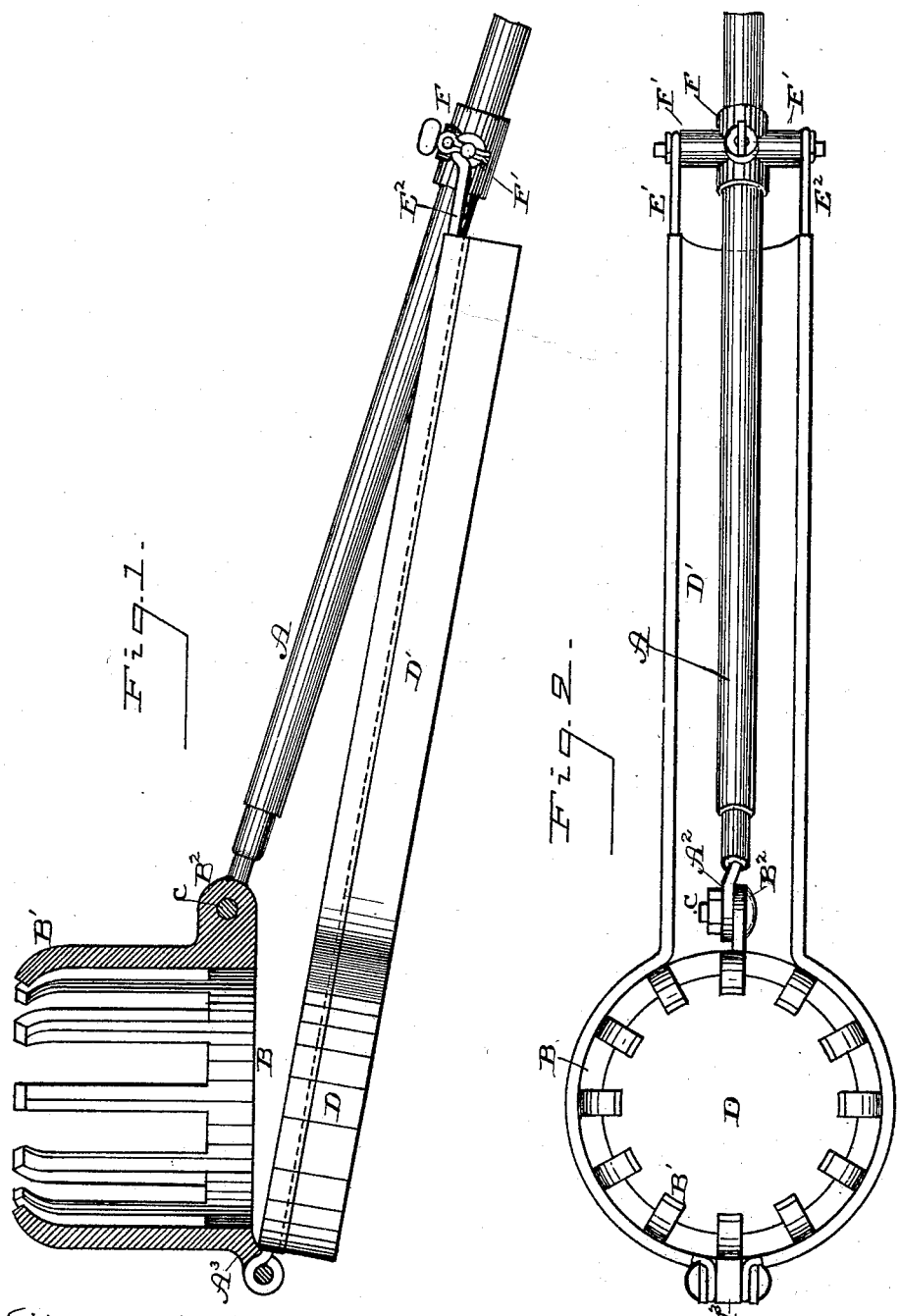

RICHARD W. CASLER, OF LITTLE FALLS, NEW YORK.

FRUIT-PICKER.

SPECIFICATION forming part of Letters Patent No. 630,446, dated August 8, 1899.

Application filed April 15, 1899. Serial No. 713,202. (No model.)

*To all whom it may concern:*

Be it known that I, RICHARD W. CASLER, a citizen of the United States, residing at Little Falls, in the county of Herkimer and State of New York, have invented certain new and useful Improvements in Fruit-Pickers, of which the following is a specification.

This invention relates to fruit pickers or gatherers; and the object of the improvement is to provide a simple and efficient device of this class whereby the fruit may be rapidly picked or detached from the trees without the necessity of climbing into the tree. I attain these objects in the construction illustrated in the accompanying drawings, in which—

Figure 1 is a longitudinal side view of the device, the picker being shown in section. Fig. 2 is a longitudinal top view of the device.

Similar letters refer to similar parts throughout both views.

A represents a pole, to the upper end of which is pivotally secured the fruit-picker comprising a ring B, having an annular series of upwardly-extending prongs or fingers B', the upper end portions of which are preferably bent inwardly. The ring is secured to the pole by means of a bolt C, which clamps the two disks $A^2$ and $B^2$ together, the disk $A^2$ being secured in the upper end of the pole and the disk $B^2$ being formed integral with the said ring.

D represents a basket adapted to receive the fruit after it has been detached from the tree.

D' represents a chute communicating with the basket and adapted to convey the fruit from the basket to the operator or to a bag which may be secured at the end of the chute.

The basket and the chute are supported by two rods E' $E^2$, which are pivotally connected to the forward side of the ring, the ring being for that purpose provided with a lug or ear $A^3$, the rear ends of the rods being connected with the rear end of the pole by means of a sleeve F, having on its sides two projecting pivots F', with which the rods are adapted to engage. The sleeve is further provided with a thumb-screw, by which the sleeve is held in position on the pole. The purpose of the rods is to enable the operator of the device to adjust the picker to different angles while operating the device, and thus avoid the lowering of the pole every time such adjustment is desired.

The operation of the device is as follows: The fruit is caught between the fingers and separated from the branch by a sudden jerk of the pole. It is then received by the basket. From thence it rolls down the chute into the bag secured at the end of the chute. By having an annular row of fingers the fruit may be picked by moving the pole in any lateral direction after the fruit is within the row, thus saving considerable time in picking the fruit as compared with fruit-pickers in which only a certain movement of the pole effects the operation. By having the picker pivotally connected with the pole the picker may be adjusted so as to maintain a horizontal plane of the picker when the pole is in an inclined position, thus enabling the operator to gather fruits located at different elevations while standing on the ground.

The object of having the upper end portions of the finger bent inwardly is to guard against the fruit slipping off the fingers when the fruit is pulled away from the branches.

I do not desire to limit myself to the particular construction herein shown and described, as I am aware that changes may be made therein without departing from the spirit and scope of my invention. For instance, the receiving-basket may be of different construction and the method of changing the angle of the picker may be modified.

Having thus described my invention, what I claim as new, and desire to secure by Letters Patent, is—

1. In a fruit-picker, the combination of a pole, a ring pivotally secured to the upper end of said pole, said ring being provided with an annular row of upwardly-extending fingers two adjusting-rods connecting the forward side of the ring and rear end of the pole, a receiving-basket and a rearwardly-extending chute mounted between the said adjusting-rods, substantially as described and for the purpose set forth.

2. In a fruit-picker, the combination of a pole, a ring pivotally secured to the upper end of said pole, said ring being provided with an annular row of upwardly-extending fingers, adjusting-rods connecting the forward side of the ring and the rear end of the pole, substantially as described and for the purpose set forth.

RICHARD W. CASLER.

Witnesses:
M. G. BRONNER,
C. J. LUNDSTROM.